US011902770B2

(12) United States Patent
Hatab

(10) Patent No.: US 11,902,770 B2
(45) **Date of Patent: *Feb. 13, 2024**

(54) SYSTEM AND METHOD FOR PROVIDING THREE-DIMENSIONAL IMMERSIVE SOUND

(71) Applicant: Harman International Industries, Incorporated, Stamford, CT (US)

(72) Inventor: Ziad Ramez Hatab, Bloomfield Hills, MI (US)

(73) Assignee: Harman International Industries, Incorporated, Stamford, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/864,960

(22) Filed: Jul. 14, 2022

(65) Prior Publication Data

US 2022/0353629 A1 Nov. 3, 2022

Related U.S. Application Data

(63) Continuation of application No. 17/164,437, filed on Feb. 1, 2021, now Pat. No. 11,418,901.

(51) Int. Cl.
*H04S 7/00* (2006.01)

(52) U.S. Cl.
CPC .......... *H04S 7/302* (2013.01); *H04S 2400/01* (2013.01); *H04S 2400/13* (2013.01)

(58) Field of Classification Search
CPC ... H04S 7/302; H04S 2400/01; H04S 2400/13
USPC .......................................................... 381/17
See application file for complete search history.

(56) References Cited

U.S. PATENT DOCUMENTS 7,373,293 B2 5/2008 Chang et al.
11,170,799 B2 11/2021 Lambrick
2009/0034772 A1 * 2/2009 Iida ........................ H04S 7/302 381/356
2015/0016617 A1 1/2015 Jain et al.
2018/0192226 A1 7/2018 Woelfl et al.

FOREIGN PATENT DOCUMENTS

WO 2020151837 A1 7/2020

OTHER PUBLICATIONS

Extended European Search Report for European Application No. 22153184.1 dated Jun. 28, 2022, 9 pgs.

* cited by examiner

*Primary Examiner* — Paul Kim
(74) *Attorney, Agent, or Firm* — Brooks Kushman P.C.

(57) ABSTRACT

In one embodiment, a system for providing three-dimensional (3D) immersive sound is provided. The system includes a loudspeaker and at least one controller. The loudspeaker transmits an audio output signal in a listening environment. The at least one controller is programmed to store a plurality of directional bands with each directional band being defined by a narrowband frequency interval and to store at least psychoacoustic scale including a sub-band for each directional band. The at least one controller is further programmed to determine an energy for the sub-band and generate a loudspeaker driving signal based at least on the energy for the sub-band to drive the loudspeaker to transmit the audio output signal.

18 Claims, 8 Drawing Sheets

| Bark | Lower Frequency (Hz) | Upper Frequency (Hz) | Center Frequency (Hz) | Bandwidth (Hz) |
|---|---|---|---|---|
| 1 | 0 | 100 | 50 | 100 |
| 2 | 100 | 200 | 150 | 100 |
| 3 | 200 | 300 | 250 | 100 |
| 4 | 300 | 400 | 350 | 100 |
| 5 | 400 | 510 | 450 | 110 |
| 6 | 510 | 630 | 570 | 120 |
| 7 | 630 | 770 | 700 | 140 |
| 8 | 770 | 920 | 840 | 150 |
| 9 | 920 | 1080 | 1000 | 160 |
| 10 | 1080 | 1270 | 1170 | 190 |
| 11 | 1270 | 1480 | 1370 | 210 |
| 12 | 1480 | 1720 | 1600 | 240 |
| 13 | 1720 | 2000 | 1850 | 280 |
| 14 | 2000 | 2320 | 2150 | 320 |
| 15 | 2320 | 2700 | 2500 | 380 |
| 16 | 2700 | 3150 | 2900 | 450 |
| 17 | 3150 | 3700 | 3400 | 550 |
| 18 | 3700 | 4400 | 4000 | 700 |
| 19 | 4400 | 5300 | 4800 | 900 |
| 20 | 5300 | 6400 | 5800 | 1100 |
| 21 | 6400 | 7700 | 7000 | 1300 |
| 22 | 7700 | 9500 | 8500 | 1800 |
| 23 | 9500 | 12000 | 10500 | 2500 |
| 24 | 12000 | 15500 | 13500 | 3500 |
| 25 | 15500 | 20000 | 17500 | 4500 |

Fig-5

SYSTEM AND METHOD FOR PROVIDING THREE-DIMENSIONAL IMMERSIVE SOUND

CROSS-REFERENCE TO RELATED APPLICATIONS

This application is a continuation of U.S. application Ser. No. 17/164,437 filed Feb. 1, 2021, now U.S. Pat. No. 11,418,901, issued Aug. 16, 2022, the disclosure of which is hereby incorporated in its entirety by reference herein.

TECHNICAL FIELD

Aspects disclosed herein generally relate to a system and method for three-dimensional (3D) immersive sound. In one example, the system and method for providing the 3D immersive sound may be based on at least one of psychoacoustic directional bands and narrow-band loudspeakers. These aspects and others will be discussed in more detail herein.

BACKGROUND

Current broadband loudspeaker arrangements have many drawbacks. One drawback is their limited sound localization, which is consistent with respect to where the loudspeakers are positioned. For example, front loudspeakers are localized in front of a listener's position, and rear loudspeakers are localized rearward of a listener's position and so on. Another drawback is that many digital signal processing (DSP) techniques used to achieve virtual height effects have either large computational loads with limited listener sweet spots or such techniques rely on sound field obstacles and room geometries to reflect sound sources.

With narrow-band loudspeaker arrangements, the hearing system forms the sound sensation in a direction that depends only on the frequency of the signal. The psychoacoustic relation between the signal frequency and the direction of the sound sensation can be described by the Blauert directional bands (BDB).

Headphones are also another way of creating 3D immersive sound, however their use is limited and/or prohibited in certain situations, such as while driving automobiles. Moreover, the headphones lack the ability of reproducing low-frequency vibrations that come from loudspeakers, especially subwoofers.

SUMMARY

In one embodiment, a system for providing three-dimensional (3D) immersive sound is provided. The system includes a loudspeaker and at least one controller. The loudspeaker transmits an audio output signal in a listening environment. The at least one controller is programmed to store a plurality of directional bands with each directional band being defined by a narrowband frequency interval and to store at least psychoacoustic scale including a sub-band for each directional band. The at least one controller is further programmed to determine an energy for the sub-band and to generate a loudspeaker driving signal based at least on the energy for the sub-band to drive the loudspeaker to transmit the audio output signal.

In at least another embodiment, a computer-program product embodied in a non-transitory computer read-able medium that is programmed for providing three-dimensional (3D) immersive sound is provided. The computer-program product includes instructions for transmitting an audio output signal in a listening environment and for storing a plurality of directional bands with each directional band being defined by a narrowband frequency interval. The computer-program product includes instructions for storing at least psychoacoustic scale including a sub-band for each directional band and for determining an energy for the sub-band. The computer-program product includes instructions for generating a loudspeaker driving signal based at least on the energy for the sub-band to drive the loudspeaker to transmit the audio output signal.

In at least another embodiment, a method for providing three-dimensional (3D) immersive sound is provided. The method includes transmitting an audio output signal in a listening environment and storing a plurality of directional bands with each directional band being defined by a narrowband frequency interval. The method includes storing at least psychoacoustic scale including a sub-band for each directional band and determining an energy for the sub-band. The method includes generating a loudspeaker driving signal based at least on the energy for the sub-band to drive the loudspeaker to transmit the audio output signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 5 depicts a psychoacoustic Bark scale including critical subbands and frequency ranges;

DETAILED DESCRIPTION

Figure 1:
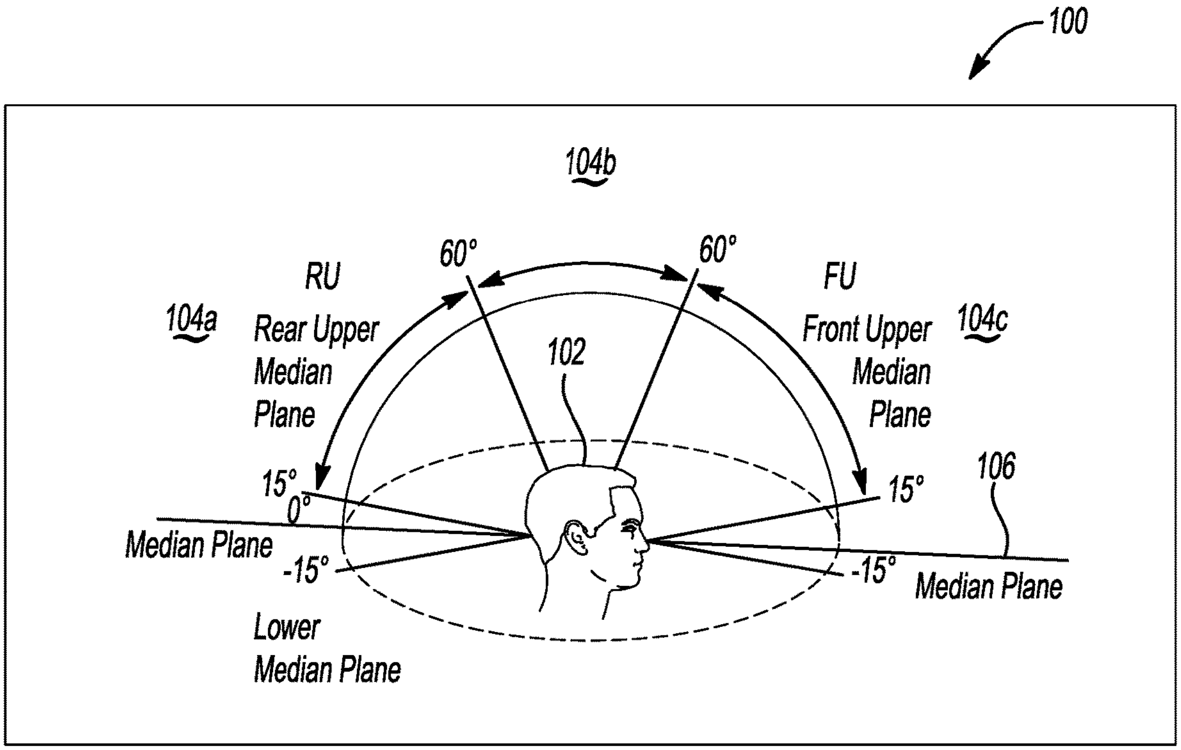
FIG. 1 depicts a corresponding listener's 3D immersive sound sensation plane as divided into a median plane and upper portions of the median plane.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that the controllers/devices as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, such controllers as disclosed utilizes one or more microprocessors to execute a computer-program that is embodied in a non-transitory computer readable medium that is programmed to perform any number of the functions as disclosed. Further, the controller(s) as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware-based inputs and outputs for receiving and transmitting data, respectively from and to other hardware-based devices as discussed herein. While the various systems, blocks, and/or flow diagrams as noted herein refer to time domain, frequency domain, etc., it is recognized that such systems, blocks, and/or flow diagrams may be implemented in any one or more of the time domain, frequency domain, etc.

Current technologies for delivering 3D immersive sound over and around the listener's position fall into the following two categories. For example, in a first category, multiple loudspeakers may be employed that utilize surround sound technologies, such as 5.1 and 7.1. These corresponding surround sound technologies have added height channels to their systems. Consequently, fully immersive 3D audio is made possible by adding loudspeakers on a ceiling and upward facing speakers, which bounce sound off of higher surfaces. New configurations, such as 11.2 or 22.4, are examples of such arrangements.

A second category for delivering 3D immersive sound involves sound bars. For example, existing sound bar technology relies on multiple loudspeakers that are arranged in a linear array. While some loudspeakers point directly across a median plane, other loudspeakers are pointed past the listening position and rely on sound being reflected off of surfaces and around a listener's position. Moreover, some sound bars may include additional digital signal processing (DSP) techniques, such as phase and magnitude compensation, in order to direct discrete channels of audio to specific locations around the listening position.

Unlike current technologies noted above, aspects disclosed herein provide, among other things, 3D immersive sound while minimizing the number of loudspeaker channels, being independent of loudspeaker placement and sound directivity, and minimizing DSP computation loads. Moreover, aspects disclosed herein may generally rely on psychoacoustic concepts of critical sub-bands (CSBs) (or sub-bands for a Bark scale (or psychoacoustic scale)), Blauert directional bands (BDBs) (or directional bands), masking thresholds, virtually elevated sound image, etc. These aspects and other will be discussed in more detail below.

FIG. 1 depicts a 3D immersive sound sensation plane 100 for a listener (or user) 102 as divided into various planes (or sectors) 104*a*-104*c*. For example, plane 104*a* may be defined as a rear upper median plane (or RU plane) in relation to the listener 102, plane 104*b* may be defined as a top median plane (or TOP plane) in relation to the listener 102, and plane 104*c* may be defined as a front upper median plane (or FU plane) in relation to the listener 102. In general, 3D immersive sound offers listener(s) 102 increased spatial dimension awareness over mono, stereo, and surround mixes. Whereas sound localization in mono, stereo, and surround mixes may be limited to a median plane 106 for the listener 102 to within ±15 degrees from the horizontal. The 3D immersive sound sensation is distributed in the upper parts (e.g., planes 104*a*-104*c*) of the median plane 106 in addition to a horizontal median plane.

Figure 2:
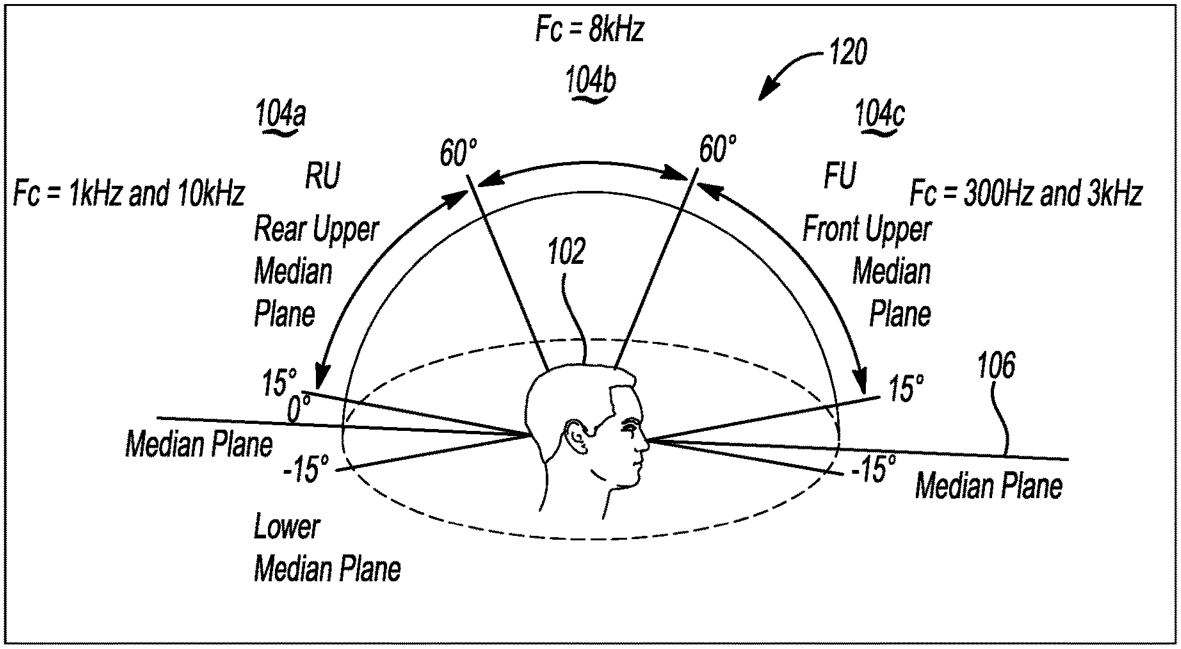
FIG. 2 depicts a schematic illustration of a localization of narrow-band sounds in the median plane irrespective of a position of a sound source.

FIG. 2 depicts a schematic illustration 120 of a localization of narrow-band sounds in the median plane 106 irrespective of a position of a sound source. Psychoacoustic research has shown that the localization of narrow-band sounds can be perceived as coming from a specific direction irrespective of the location of the sound source. In other words, the human hearing system forms sound sensations in directions that depend on frequencies of an audio signal. The psychoacoustic function between the signal frequency and the direction of the sound sensation can be described by Blauert's directional bands as illustrated in FIG. 2 below (see also J. Blauert, "Sound Localization in the Median Plane", Acta Acustica 22(4), pp. 205-13, November 1969 and H. Fastl and E. Zwicker, "Psychoacoustics Facts and Models", Third Edition, Springer 2007).

If narrow-band sounds with a center frequency of, for example, 300 Hz or 3 kHz are presented to the listener 102, the sound stage is perceived by the listener 102 in the FU plane 104*c* of the median plane 106. Narrow-band sounds centered at, for example, 8 kHz are perceived as coming from the TOP plane 104*b* of the median plane 106 even if the sound source is located in front of the listener 102. Narrow-band sounds centered at, for example, 1 kHz or 10 kHz are perceived to originate in the RU plane 104*a* of the median plane 106 irrespective of the actual location of the sound source.

Figure 3A:
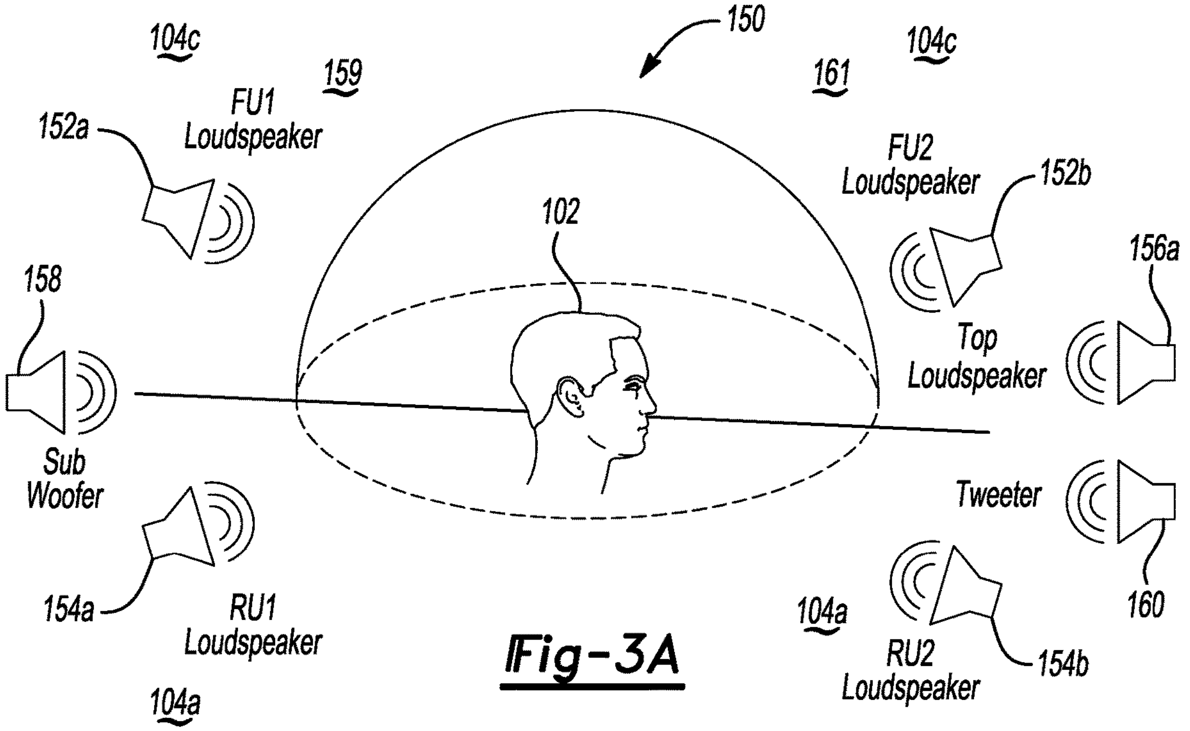
FIG. 3A depicts various example placements for psychoacoustic loudspeakers, a sub-woofer, and a tweeter in a first configuration in a listening environment.

FIG. 3A depicts various one example implementation 150 of placements or positions for psychoacoustic loudspeakers 152*a*-152*b*, 154*a*-154*b*, and 156*a*, a sub-woofer 158, and a tweeter 160 in a listening environment 161. In general, the number of psychoacoustic loudspeakers 152*a*-152*b*, 154*a*-154*b*, and 156*a* implemented is based at least on the number of Blauert directional bands (BDBs). The psychoacoustic loudspeakers 152*a*, 152*b* may be orientated to provide audio to the listener 102 in the FU plane 104*c* of the listening environment 161. The psychoacoustic loudspeakers 154*a*, 154*b* may be orientated to provide audio to the listener 102 in the RU plane 104*a* of the listening environment 161. The psychoacoustic loudspeakers 156*a* may be orientated to provide audio in the TOP plane 104*b* of the listening environment 161. The sub-woofer 158 and the tweeter 160 supplement the psychoacoustic loudspeakers 152*a*-152*b*, 154*a*-154*b*, and 156*a* to provide audio in a low frequency range (e.g., sub-woofer range) and a high frequency range (e.g., tweeter range), respectively. For the sake of clarification, it is recognized that the psychoacoustic loudspeakers 152*a*-152*b*, 154*a*-154*b*, and 156*a* are actual and physical loudspeakers. An audio source 159 may be positioned in the listening environment 161 and transmit audio to the various psychoacoustic loudspeakers 152*a*-152*b*, 154*a*-154*b*, 156*a*, the subwoofer 158, and the tweeter 160 for playback in the listening environment 161.

Figure 3B:
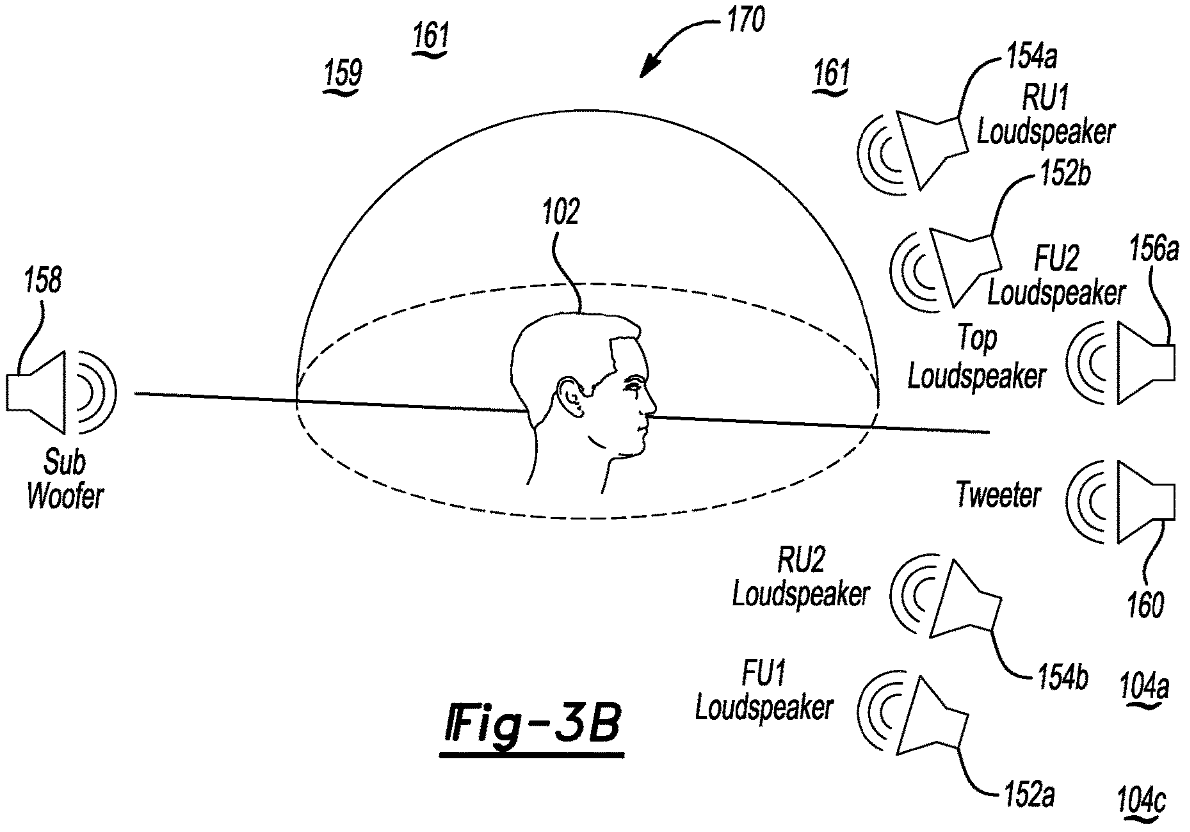
FIG. 3B depicts various example placements for psychoacoustic loudspeakers, a sub-woofer, and a tweeter in a second configuration in the listening environment.

In general, the placement or location of one or more of the psychoacoustic loudspeakers 152*a*-152*b*, 154*a*-154*b*, 156*a* may be independent of the location of the desired sound source (or audio source 159). This is further illustrated the implementation 170 in FIG. 3B in which the all of the psychoacoustic loudspeakers 152*a*-152*b*, 154*a*-154*b*, and 156*a* are positioned in front of the listener 102. By contrast, in FIG. 3A, the psychoacoustic loudspeakers 152*a* and 154*a* are positioned rearward of the listener 102*a* and the psychoacoustic loudspeakers 152*b*, 154*b*, and 156*a* The subwoofer 158 may be placed anywhere in the room enclosure (or listening environment 161) due to its omnidirectional nature. The tweeter 160 may be placed in front of the listener 102 due to its focused-beam directionality. In general, for both implementations 150, 170, each shall generate comparable 3D immersive effects.

The psychoacoustic speakers 152*a*-152*b*, 154*a*-154*b*, and 156*a* may be a combination of individual narrow-band speakers encompassing a psychoacoustic critical sub-band scale, such as the Bark scale or an equivalent rectangular bandwidth (ERB) scale or the Mel scale. Additionally, or alternatively, any one of the psychoacoustic speakers 152*a*-152*b*, 154*a*-154*b*, and 156*a* may be a single loudspeaker that covers the BDB frequency range.

Figure 4:
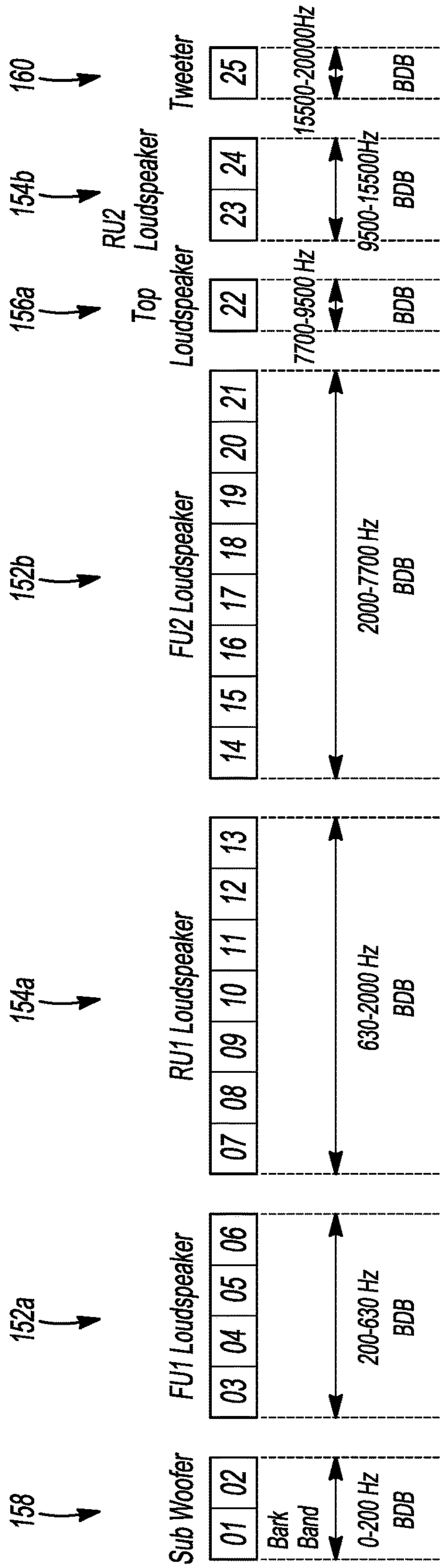
FIG. 4 depicts a relationship between Blauert directional bands and critical subbands.

FIG. 4 depicts a relationship between Blauert directional bands (BDBs) and critical subbands (CSBs) for the various psychoacoustic loudspeakers 152*a*-152*b*, 154*a*-154*b*, and 156*a*. FIG. 5 depicts corresponding Blauert directional bands and frequencies that will be referenced to in connection with the description below for FIG. 4. The CSBs are designated as Bark Nos. (e.g., 1-25) and a corresponding BDB comprises a grouping of CSBs which define a frequency range. As generally shown for the psychoacoustic loudspeaker 152*a* (e.g., the FU1 based loudspeaker), the psychoacoustic loudspeaker 152*a* may comprise four separate narrow-band speakers that cover Bark bands 3, 4, 5, and 6, (see FIG. 4 and FIG. 5, under heading "Bark") or one loudspeaker with a programmable center frequency in the range of 250 Hz to 570 Hz (see FIG. 5 under heading "Center Frequency (Hz)"), or any grouping combination of these 4 Bark bands. The psychoacoustic loudspeaker 154*a* (e.g., the RU1 based loudspeaker) comprises seven separate narrow-band speakers that covers Bark bands 7, 8, 9, 10, 11, 12, 13 (see FIG. 4 and FIG. 5, under heading "Bark") or one loudspeaker with a programmable center frequency in the range of 700 Hz to 1850 Hz (see FIG. 5 under heading "Center Frequency (Hz)"), or any grouping combination of these 7 Bark bands.

The psychoacoustic loudspeaker 152*b* (e.g., the FU2 based loudspeaker) comprises eight separate narrow-band speakers that covers Bark bands 14, 15, 16, 17, 18, 19, 20, 21 (see FIG. 4 and FIG. 5, under heading "Bark") or one loudspeaker with a programmable center frequency in the range of 2150 Hz to 7000 Hz (see FIG. 5 under heading "Center Frequency (Hz)", or any grouping combination of these 8 Bark bands. The psychoacoustic loudspeaker 156*a* (e.g., the TOP loudspeaker) comprises a single narrow-band loudspeaker covers Bark band 22 (see FIG. 4 and FIG. 5, under heading "Bark") or single loudspeaker with a programmable center frequency in the range of 8500 Hz (see FIG. 5 under heading "Center Frequency (Hz)").

The psychoacoustic loudspeaker 154*b* (e.g., the RU2 loudspeaker) comprises two narrow-band loudspeakers that covers Bark bands 23, 24 (see FIG. 4 and FIG. 5, under heading "Bark") or single loudspeaker with a programmable center frequency in the range of 10500 Hz to 13500 Hz (see FIG. 5 under heading "Center Frequency (Hz))". The loudspeaker 158 (e.g., the subwoofer) comprises two narrow-band loudspeakers that covers Bark bands 1, 2 (see FIG. 4 and FIG. 5, under heading "Bark") or single loudspeaker with a programmable center frequency in the range of 50 Hz to 150 Hz (see FIG. 5 under heading "Center Frequency (Hz)"). The loudspeaker 160 (e.g., the tweeter loudspeaker) comprises a single narrow-band loudspeaker covers Bark band 25 (see FIG. 4 and FIG. 5, under heading "Bark") or a loudspeaker with a programmable center frequency in the range of 17750 Hz (see FIG. 5 under heading "Center Frequency (Hz)". In general, aspects disclosed herein provide, but not limited to, a system and method to modify energies in CSBs and BDBs to increase a directionality factor while minimizing any added distortions. For example, the spectral content in CSBs and DBDs can elevate the perceived sound image without using physical height loudspeakers.

Figure 6:
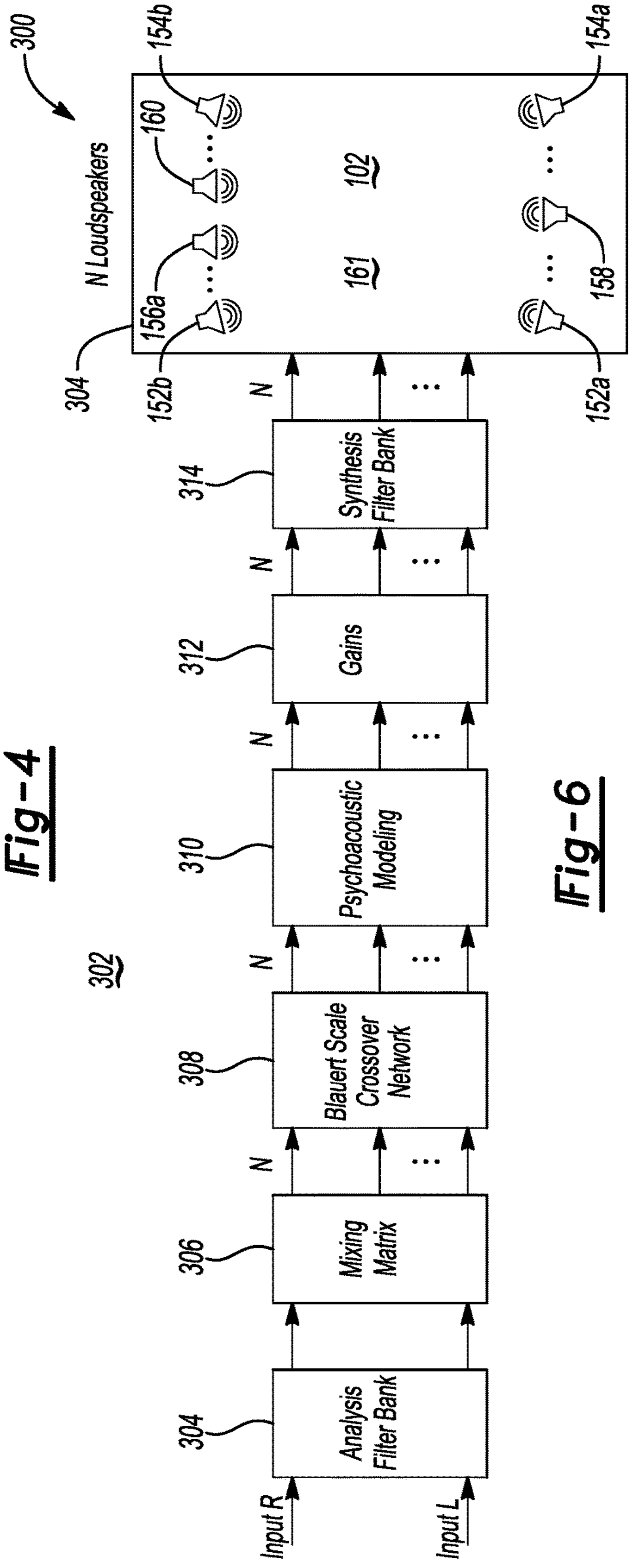
FIG. 6 depicts a system for providing 3D immersive sound based on at least one psychoacoustic directional bands and narrow-band loudspeakers in accordance to one embodiment.

FIG. 6 depicts a system 300 for providing 3D immersive sound based on at least one psychoacoustic directional bands and narrow-band loudspeakers in accordance to one embodiment. The system 300 includes at least one controller 302 (hereafter "controller 302") that is operably coupled to a plurality of loudspeakers 304 (e.g., the psychoacoustic loudspeakers 152*a*-152*b*, 154*a*-154*b*, and 156*a*; the subwoofer 158; and the tweeter 160). It is recognized that the controller 302 may include any number of digital signal processors (DSPs) and is generally programmed to provide an input audio signal to the plurality of loudspeakers 304 for playback for the listener 102 in the listening environment 161.

The controller 302 includes a first filter bank 304, a mixing matrix block 306, a crossover network 308 (e.g., a Blauert crossover network 308), a psychoacoustic modeling block 310, a gain block 312, and a second filter bank 314. The input audio signal may be divided into a right channel and a left channel and both channel signals are provided to the first filter bank 304. The first filter bank 304 transforms the channel signals from a time domain into a frequency domain. The first filter bank 304 may map the frequency domain channel signals to a set of M critical sub-bands (CSB) according to Bark, Mel, or ERB scales. For example, the mapping performed by the first filter bank 304 may be a linear transformation of the discrete frequencies in the Hertz scale to discrete subbands in the Bark, Mel, or ERB scales.

The mixing matrix block 306 may reduce or increase the number of input channels to match the number of loudspeakers, N, by applying various scaling factors. For the example in FIG. 6, the N output channels from the mixing matrix block 306 may be equal to a linear combination of the right and left input channels, in the case of a stereo input signal, from the analysis filter block 304. For example, Channel 1=0.5*inputR+0.5*inputL and so on for the other N−1 channels. In this example, the multiplication factor of 0.5 is a real quantity, however the multiplication factor may also be a complex quantity. The crossover network 308 groups the BDBs to the various loudspeakers 152*a*-152*b*, 154*a*-154*b*, 156*a*, 158, and 160 according to CSB pre-configured mappings as illustrated in the example shown in FIG. 4. As noted in connection with FIG. 4, the CSBs are designated as Bark Nos. (e.g., 1-25) and a corresponding BDB comprises a grouping of CSBs which define a frequency range.

The psychoacoustic modeling block 310 calculates the energy, masking hearing threshold, and a difference (or delta (A)) between the energy and the masking hearing threshold for each CSB within a BDB. Energy in a CSB is the magnitude squared of the complex quantity associated with the CSB as calculated by the filter bank block 304. The masking hearing threshold of a CSB within a BDB is an acoustic level below which any CSB energy is inaudible while any energy level above it is audible by a human. Masking threshold calculations may be based on the psychoacoustic model as set forth in H. Fastl and E. Zwicker, "Psychoacoustics Facts and Models", Third Edition, Springer 2007 as introduced above. The psychoacoustic modeling block 310 calculates delta (A) (or the difference between the energy and the masking hearing threshold) for each CSB within a BDB. The gain block 312 applies gains to the N channels from the crossover network block 308 to either amplify or attenuate the energy for the CSB. By either amplifying or attenuating the energy content in each CSB within a BDB, this aspect may increase the directionality factor for a particular loudspeaker while minimizing any added distortions. This aspect will be discussed in more detail in connection with FIG. 8.

Figure 7:
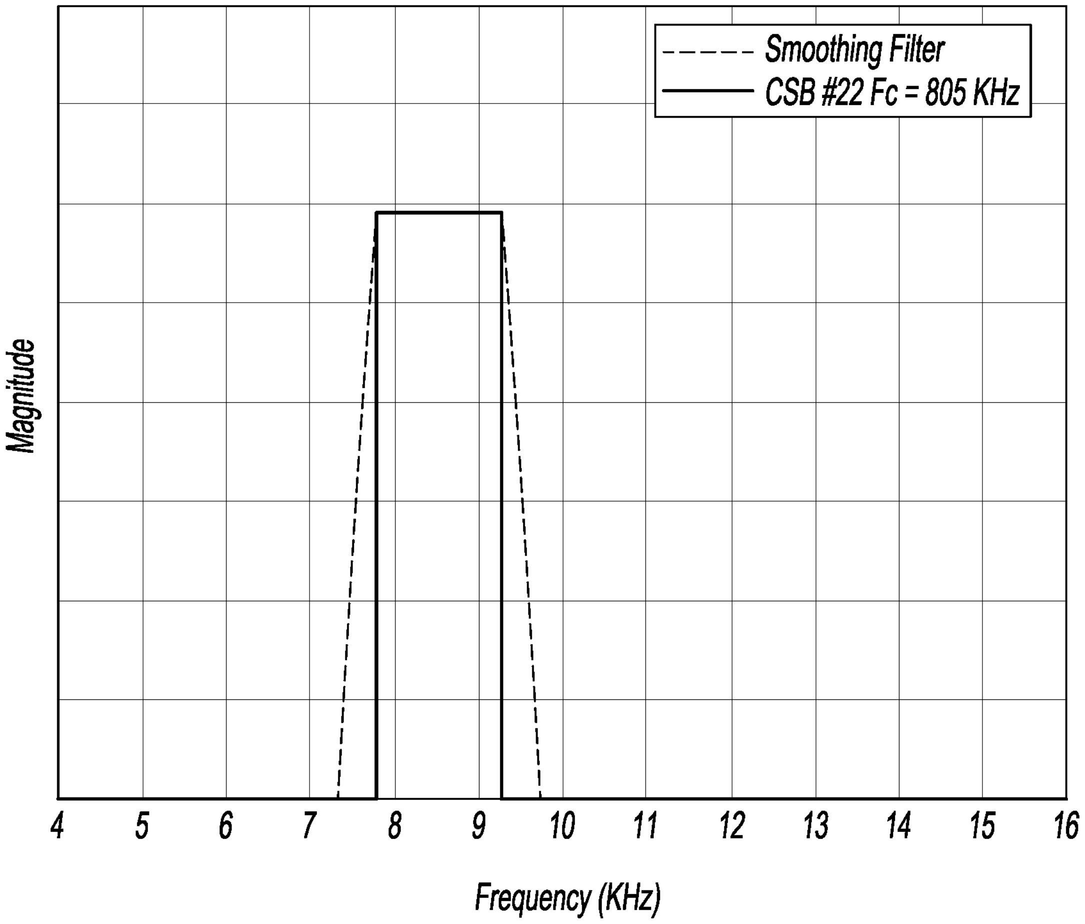
FIG. 7 depicts a plot that illustrates one example of a smoothing filter for a selected BDB band that enhances frequencies inside the BDB while attenuating frequencies outside the BDB in accordance to one embodiment.

The second filter bank 314 transforms the BDBs loudspeaker channels from the frequency domain back into the time domain and the second filter bank 314 also applies a smoothing filter. The smoothing filter for a given BDB band is chosen so that it enhances frequencies inside the BDB while attenuating frequencies outside the BDB. This is further illustrated in FIG. 7 which depicts an example of a BDB with a single CSB #22 and a center frequency of 8.5 KHz. In general, BDD loudspeaker channels correspond to the various channels associated with the psychoacoustic loudspeakers 152*a*-152*b*, 154*a*-154*b*, and 156*a* (e.g., loudspeakers that transmit audio in the FU1, FU2, RU1, RU2, and TOP planes). The time domain based narrow band signals (or loudspeaker driving signals) are used to drive the plurality of loudspeakers 304 with possible amplification.

Figure 8:
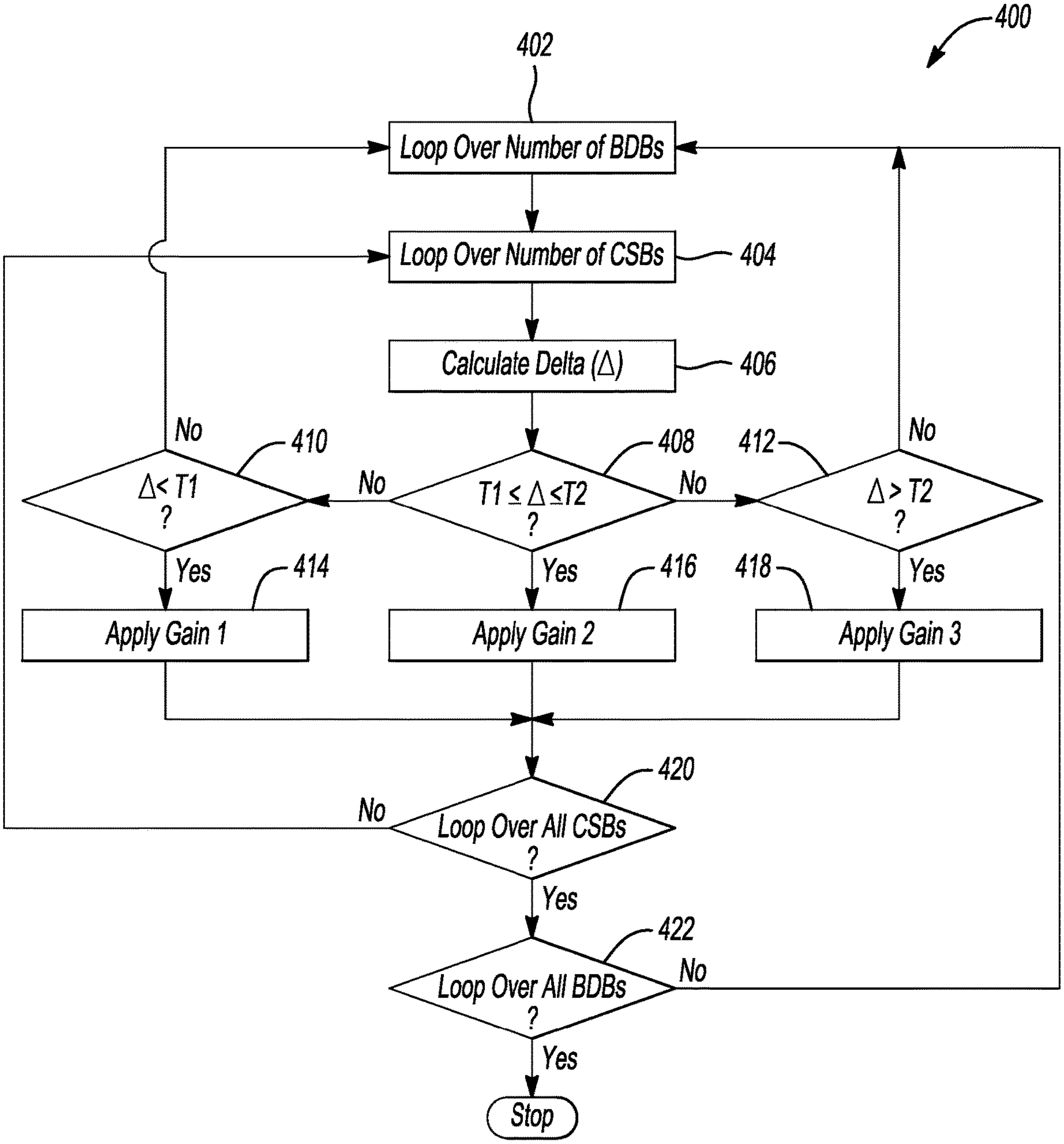
FIG. 8 depicts a method for providing 3D immersive sound based on at least one psychoacoustic directional band and narrow-band loudspeakers in accordance to one embodiment.

FIG. 8 depicts a method 400 for providing 3D immersive sound based at least one psychoacoustic directional bands and narrow-band loudspeakers in accordance to one embodiment. In operation 402, the controller 302 loops through the various BDB groupings (e.g., BDB groupings for the associated psychoacoustic loudspeakers 152*a*-152*b*, 154*a*-154*b*, and 156*a*; the subwoofer 158; and the tweeter 160) stored in memory thereof. Similarly, in operation 404, the controller 302 loops over the various CSB (or Bark scales) groupings for each BDB grouping.

In operation 406, the controller 302 calculates the energy for each CSB. Similarly, the controller 302 calculates a difference (or delta (Δ)) between the calculated energy and the masking hearing threshold for each CSB in a BDB grouping. In operation 408, the controller 302 compares delta (Δ) to a first threshold T1 and to a second threshold T2. It is recognized that the first threshold T1 and the second threshold T2 correspond to predetermined values and may vary based on the desired criteria of a particular implementation. If the controller 302 determines that delta (Δ) is greater than the first threshold T1 and less than the second threshold T2, then the method 400 moves to operation 416. If not, then the method moves to operation 410 and 412.

In operation 410, the controller 302 determines whether delta (Δ) is less than first threshold, T1. If this condition is true, then the method 400 proceeds to operation 414 whereby the controller 302 applies a first gain G1 via the gain block 312 to the CSB (e.g., the audio output that corresponds to the CSB (or Bark scale #) that includes the lower frequency, the upper frequency, center frequency, and the bandwidth) that meets the conditions as set forth in operation 410. In operation 414, the controller 302 applies the first gain G1 to a single CSB within a BDB grouping. It is recognized that the first gain G1 may correspond to an attenuated gain (reduction) or a gain that increases the audio output (or an attenuated gain (reduction) or a gain that increases the audio output for a single CSB within the BDB grouping). Thus, the net result of applying the first gain G1 to the single CSB within a BDB grouping leads to a driving signal being generated to drive a corresponding psychoacoustic loudspeaker 152*a*-152*b*, 154*a*-154*b*, or 156*a* that outputs audio at the center frequency designated by the CSB with such a gain. After all of the gains are applied to the CSBs in the frequency domain, the controller 302 transforms the N-channel signals to the time domain via the second filter bank block 314 and applies smoothing filters with chosen center frequencies as noted above. It is further recognized that the first gain G1 may correspond to a real number and/or a complex number. As noted above, the increase in the gain (e.g., the first gain G1, the second gain G2, and the third gain G3) applied to a corresponding CSB may increase the directionality factor for that CSB. Conversely, the decrease in the gain applied to the corresponding CSB may decrease the distortion for that the CSB.

In operation 412, the controller 302 also determines whether delta (Δ) is greater than the second threshold, T2. If this condition is true, then the method 400 proceeds to operation 418 whereby the controller 302 applies a third gain G3 via the gain block 312 to the CSB (e.g., the audio output that corresponds to the CSB (or Bark scale #) that includes the lower frequency, the upper frequency, center frequency, and the bandwidth) that meets the conditions as set forth in operation 412. In operation 418, the controller 302 applies the third gain G3 to a single CSB within a BDB grouping. It is recognized that the third gain G3 may correspond to an attenuated gain (reduction) or a gain that increases the audio output (or an attenuated gain (reduction) or a gain that increases the audio output for a single CSB within the BDB grouping). Thus, the net result of applying the first gain G3 to the single CSB within a BDB grouping leads to a driving signal being generated to drive a corresponding psychoacoustic loudspeaker 152*a*-152*b*, 154*a*-154*b*, or 156*a* that outputs audio at the center frequency designated by the CSB with such a gain. It is further recognized that the third gain G3 may correspond to a real number and/or a complex number.

In operation 416, the controller 302 applies a second gain G2 via the gain block 312 to the CSB (e.g., the audio output that corresponds to the CSB (or Bark scale #) that includes the lower frequency, the upper frequency, center frequency, and the bandwidth) that meets the conditions as set forth in operation 408. In operation 416, the controller 302 applies the third gain G3 to a single CSB within a BDB grouping. It is recognized that the second gain G2 may correspond to an attenuated gain (reduction) or a gain that increases the audio output. It is recognized that the second gain G2 may correspond to an attenuated gain (reduction) or a gain that increases the audio output (or an attenuated gain (reduction) or a gain that increases the audio output for a single CSB within the BDB grouping). Thus, the net result of applying the second gain G2 to the single CSB within a BDB grouping leads to a driving signal being generated to drive a corresponding psychoacoustic loudspeaker 152*a*-152*b*, 154*a*-154*b*, or 156*a* that outputs audio at the center frequency designated by the CSB with such a gain. It is further recognized that the second gain G2 may correspond to a real number and/or a complex number.

In operation 420, the controller 302 determines whether all of the CSBs (i.e., Bark scales) for a particular BDB has been examined with respect to the analysis regarding delta (Δ), comparison to thresholds T1, T2, and T3 and the application of the first gain G1, the second gain G2, and the third gain G3. If all of the CSBs for a particular BDB have been examined, then the method 400 moves to operation 422. If not, then the method 400, moves back to operation 404 to loop to the next CSB that needs to be examined.

In operation 422, the controller 302 determines whether all of the BDBs have been examined. If all of the BDBs have been examined, then the method 400 stops. If not all of the BDBs have been examined, then the method 400 moves back to operation 402 to examine the next BDB.

Figure 9:
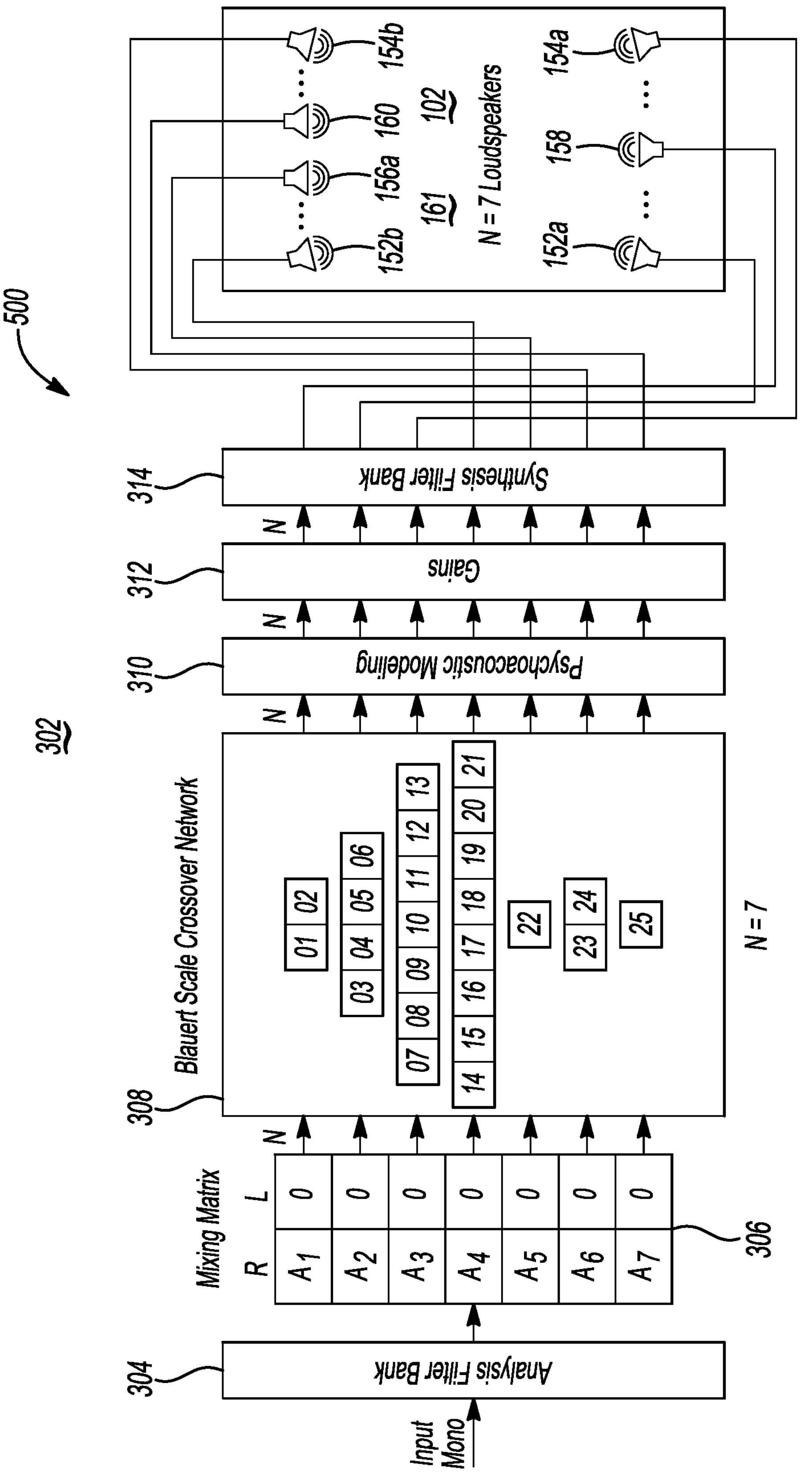
FIG. 9 depicts one example of the system for providing 3D immersive sound based on at least one psychoacoustic directional band and narrow-band loudspeakers in accordance to one embodiment in accordance to one embodiment.

FIG. 9 depicts an example system 500 for providing 3D immersive sound based at least one psychoacoustic directional bands and narrow-band loudspeakers in accordance to one embodiment in accordance to one embodiment. The system 500 as illustrated in connection with FIG. 9 is generally similar to the system 300 as illustrated in connection with FIG. 6. However, the system 500 depicts that the audio input signal is that of a mono-input audio signal. In this case, the mixing matrix block 306 up-mixes the single mono input channel to N output channels that correspond to the number of loudspeakers. The Nth output channel is given as a scaled version of the mono input channel, for example, Channel1=A1*InputR (where A1 corresponds to the multiplication factor and A2-A7 additionally also applies to the multiplication factor). The mixing matrix block 306 as illustrated in FIG. 9 depicts that the amplitude for the left channels are zeroed out given that the system 500 only receives the mono-input audio signal. The crossover network block 308 illustrates, for example, the 25 Bark scales (as referenced to in FIG. 5) being applied to the mono-input audio signal. As noted above, the one or more of the 25 Bark scales (or CSBs) are grouped into the BDBs.

Figure 10:
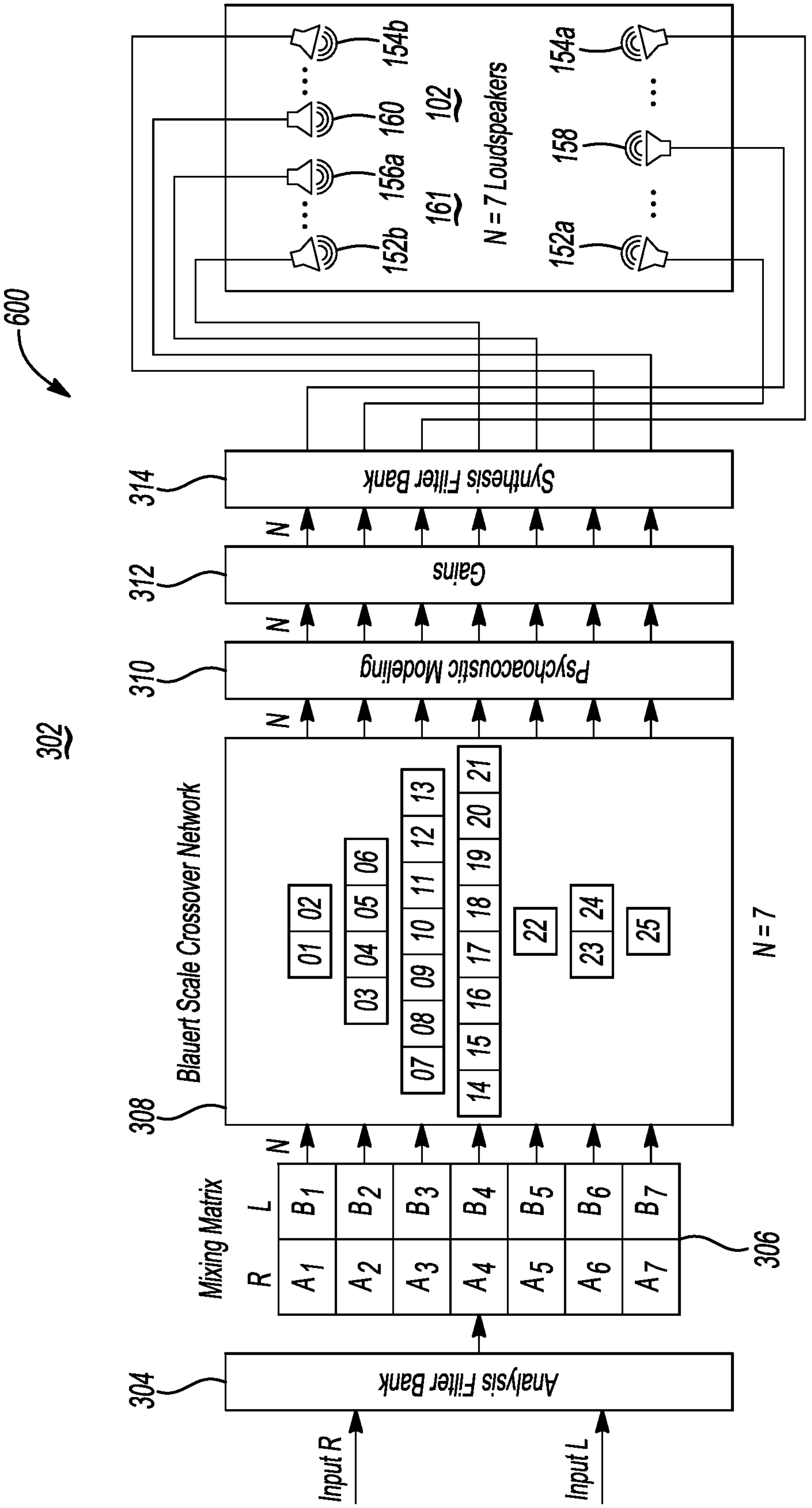
FIG. 10 depicts another example of the system for providing 3D immersive sound based on at least one psychoacoustic directional band and narrow-band loudspeakers in accordance to one embodiment in accordance to one embodiment.

FIG. 10 depicts an example system 600 for providing 3D immersive sound based at least one psychoacoustic directional bands and narrow-band loudspeakers in accordance to one embodiment in accordance to one embodiment. The system 600 as illustrated in connection with FIG. 10 is generally similar to the system 300 as illustrated in connection with FIG. 6. The system 600 also depicts that the audio input signal is that of a stereo-input audio signal. In this case, the mixing matrix block 306 as illustrated in FIG. 9 depicts that the amplitude for the right and left channels given that the system 600 receives the stereo-input audio signal. The mixing matrix block 306 up-mixes the dual stereo input channels to N output channels corresponding to the number of loudspeakers. The Nth output channel is given as a scaled version of the stereo input channels, for example, Channel1=A1*InputR+B1*InputL, Channel2=A2*InputR+B2*InputL and so on where A1-A7 and B1-B7 correspond to multiplication factors. The crossover network block 308 illustrates, for example, the 25 Bark scales (as referenced to in FIG. 5) being applied to the mono-input audio signal. As noted above, the one or more of the 25 Bark scales (or CSBs) are grouped into the BDBs.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for providing three-dimensional (3D) immersive sound, the system comprising:

a loudspeaker for transmitting an audio output signal in a listening environment; and at least one controller being programmed to:

receive an input audio signal;

store a plurality of Blauert directional bands associated with the input audio signal with each Blauert directional band being defined by a narrowband frequency interval;

store at least one psychoacoustic scale including at least one sub-band for each Blauert directional band;

determine an energy for each sub-band in the Blauert directional bands; and generate a loudspeaker driving signal based at least on the energy for the sub-band to drive the loudspeaker to transmit the audio output signal.

2. The system of claim 1, wherein the at least one controller is further programmed to establish a first value based on the energy for the sub-band and a masking hearing threshold.

3. The system of claim 2, wherein the masking hearing threshold corresponds to an audible signal that is hearable by a listener.

4. The system of claim 2, wherein the at least one controller is further programmed to compare the first value to one or more thresholds.

5. The system of claim 4, wherein the at least one controller is further programmed to apply a gain to the loudspeaker driving signal based on the comparison of the first value to the one or more thresholds.

6. The system of claim 5, wherein the gain performs one of an increase in a directivity of the audio output signal or minimizes distortion on the audio output signal.

7. The system of claim 1, wherein the at least one psychoacoustic scale is at least one Bark scale including at least one of lower frequency, an upper frequency, a center frequency, and a bandwidth.

8. A computer-program product embodied in a non-transitory computer read-able medium that is programmed for providing three-dimensional (3D) immersive sound, the computer-program product comprising instructions and being executable by at least one controller for:

receiving an input audio signal;

storing a plurality of Blauert directional bands with each Blauert directional band being defined by a narrowband frequency interval;

storing at least one psychoacoustic scale including at least one sub-band for each Blauert directional band;

determining an energy for each sub-band for each Blauert directional band; and generating a loudspeaker driving signal based at least on the energy for each sub-band to drive a loudspeaker to transmit an audio output signal in a listening environment.

9. The computer-program product of claim 8 further comprising instructions for establish a first value based on the energy for the sub-band and a masking hearing threshold.

10. The computer-program product of claim 9, wherein the masking hearing threshold corresponds to an audible signal that is hearable by a listener.

11. The computer-program product of claim 9 further comprising instructions for comparing the first value to one or more thresholds.

12. The computer-program product of claim 11 further comprising instructions for applying a gain to the loudspeaker driving signal based on the comparison of the first value to the one or more thresholds.

13. The computer-program product of claim 12, wherein the gain performs one of an increase in a directivity of the audio output signal or minimizes distortion on the audio output signal.

14. The computer-program product of claim 8, wherein the at least one psychoacoustic scale is at least one Bark scale including at least one of a lower frequency, an upper frequency, a center frequency, and a bandwidth.

15. A method for providing three-dimensional (3D) immersive sound, the method comprising:

receiving an input audio signal;

storing a plurality of Blauert directional bands with each Blauert directional band being defined by a narrowband frequency interval;

storing at least one psychoacoustic scale including at least one sub-band for each Blauert directional band;

determining an energy for each sub-band for each Blauert directional band; and generating a loudspeaker driving signal based at least on the energy for each sub-band to drive a loudspeaker to transmit an audio output signal in a listening environment.

16. The method of claim 15 further comprising instructions for determining a first value based on the energy for the sub-band and a masking hearing threshold.

17. The method of claim 16 further comprising instructions for comparing the first value to one or more thresholds.

18. The method of claim 17 further comprising instructions for applying a gain to the loudspeaker driving signal based on the comparison of the first value to the one or more thresholds.

* * * * *